United States Patent [19]

Wallace

[11] Patent Number: 4,692,578

[45] Date of Patent: Sep. 8, 1987

[54] UNIVERSAL MATRIX SWITCHING DEVICE

[75] Inventor: John E. Wallace, Athens, Ala.

[73] Assignee: The Boeing Company, Seattle, Wash.

[21] Appl. No.: 9,027

[22] Filed: Jan. 28, 1987

Related U.S. Application Data

[63] Continuation of Ser. No. 758,783, Jul. 25, 1985, abandoned.

[51] Int. Cl.[4] .................... H01H 63/00; H01H 67/00; H02B 1/02; H04Q 1/02

[52] U.S. Cl. .............................. 200/175; 340/825.22; 340/825.79; 361/352

[58] Field of Search .............................. 200/175–180; 361/352, 416; 339/18 R, 18 C, 18 P; 340/825.22, 825.23, 825.79, 825.8, 825.83; 364/802; 324/73 R; 250/209

[56] References Cited

U.S. PATENT DOCUMENTS

| | | | |
|---|---|---|---|
| 3,151,923 | 10/1964 | Bell et al. | 361/352 X |
| 3,191,040 | 6/1965 | Critchlow | 250/209 |
| 3,219,927 | 11/1965 | Topp, Jr. et al. . | |
| 3,225,322 | 12/1965 | Reel | 361/352 X |
| 3,353,138 | 11/1967 | Loose | 361/352 X |
| 3,432,797 | 3/1969 | Tardieu | 361/352 X |
| 3,631,374 | 12/1971 | Cartelli | 339/18 C |
| 3,796,848 | 3/1974 | Southworth, Jr. . | |
| 3,905,020 | 9/1975 | Knox . | |
| 4,215,420 | 7/1980 | Kassakian | 364/802 |
| 4,326,191 | 4/1982 | Schlecht et al. | 340/825.79 |
| 4,421,965 | 12/1983 | Gentric et al. | 200/175 |
| 4,618,755 | 10/1986 | Wallace | 200/175 |

*Primary Examiner*—J. R. Scott

*Attorney, Agent, or Firm*—Finnegan, Henderson, Farabow, Garrett & Dunner

[57] ABSTRACT

A universal matrix switching device used with an automatic test system under computer control for interfacing with a unit under test. The switching device providing high speed switching of conductor pins in a matrix board. The device using oppositely disposed push-type actuators to move the conductor pins from a first conductor position to a second conductor position and returning the pins to the first conductor position.

2 Claims, 3 Drawing Figures

UNIVERSAL MATRIX SWITCHING DEVICE

This application is a continuation of application Ser. No. 758,783, filed July 25, 1985, now abandoned.

BACKGROUND OF THE INVENTION

This invention relates to a matrix switching device and more particularly, but not by way of limitation, to a universal matrix switching device used with an automatic test system under computer control for interfacing with a unit to be tested.

Heretofore, matrix units exhibited poor transmission characteristics at high frequency. Above one megahertz serious loss would occur from radiation or from signal reflection due to impedance mismatches with 50 OHM coaxial interfaces commonly found in test systems. To have good high frequency transmission qualities the matrix must provide for impedance matching and for isolation between signal paths.

Prior matrix switching devices have had uniforms spacing of conductors in their design. As a result a signal and its return have differing amounts of interferences induced in them from adjacent signal paths. The uniform layout of signal lines results in poor common mode rejection quality. This problem is intensified as the frequency of operation is increased.

Also, prior matrix switching devices have relied on a single relocatable actuator to close cross-point switches. In an automatic test application this design is unsuitable because the single actuator will have to travel excessively long distances to provide the sequential switching at random locations. Consequentially, both excessive wear and time delays will be incurred in its operation. Additionaly, a single actuator design concentrates all switch operations on the one actuator causing a reduction in the unit's operating life.

Prior matrix switching devices have not had the capability to open individual switches in the matrix. A reset of all switches is necessary to reset one switch. This is a severe limitation in automatic test applications.

Various switching devices are described in the following United States Patents: U.S. Pat. No. 3,191,040 to Critcholow, U.S. Pat. No. 3,219,927 to Topp, Jr., et al, U.S. Pat. No. 3,631,374 to Cartelli, U.S. Pat. No. 3,796,848 to Southworth, Jr., U.S. Pat. No. 3,905,020 to Knox, U.S. Pat. No. 4,215,420 to Kassakian, U.S. Pat. No. 4,326,191 to Schlecht et al. None of these prior art patents specifically described and point out the unique features and combination of structure of the subject universal matrix switching device as described herein. This application is a companion to U.S. Pat. No. 4,618,755, entitled UNIVERSAL MATRIX SWITCHING DEVICE issued Oct. 21, 1986.

SUMMARY OF THE INVENTION

The subject universal matrix switching device provides for high quality frequency transmission by providing for high speed switching of conductor pins in a matrix board.

The switching device is used with an automatic test system for switching impedance or other devices into circuits being routed through the matrix board. The invention provides for increased operating life, improved current, voltage and power handling characteristics and eliminates the above-mentioned problems characteristic of prior switching matrices.

The subject switching device is an improvement over my prior switching device using bi-directional solenoids with latches for improved reliability and reduced development and production costs, as disclosed in the aforementioned U.S. Pat. No. 4,618,755, the disclosure of which is incorporated herein by reference. Further, this improvement is made possible by eliminating non-matrix switch functions that restricted actuator locations to one side of the matrix board.

Further, the subject improved switching device eliminates the need for hook and pull pins with actuators thereby providing tolerance relief in the manufacturing of the position table, actuator and latch, pin design and matrix board design.

The universal matrix switching device connected to a computer controller for interfacing with a unit under test includes a position table with movable plate having a plurality of actuators mounted thereon. The actuators are under computer control and disposed on opposite sides of a matrix board for engaging the opposite end of movable pins disposed in the matrix board. The matrix board includes a plurality of apertures therethrough and slots cut on both sides of the board and orthogonally oriented with the slots forming a grid pattern. Transmission conductor strips are received in the slots for conducting a signal input to output. The movable pins are received in the apertures in the matrix board and include electrical contacts therearound. The opposite ends of the pins extend outwardly from the opposite side of the matrix board for engagement by the oppositely disposed actuators. The actuators move the individual pins from a first position to a second position. The actuators on the other side of the matrix board move the pins from the second position to the first position.

The advantages and objects of the invention will become evident from the following detailed description of the drawings when read in connection with the accompanying drawings which illustrate preferred embodiments of the invention.

DETAILED DESCRIPTION OF THE DRAWINGS

Figure 1:
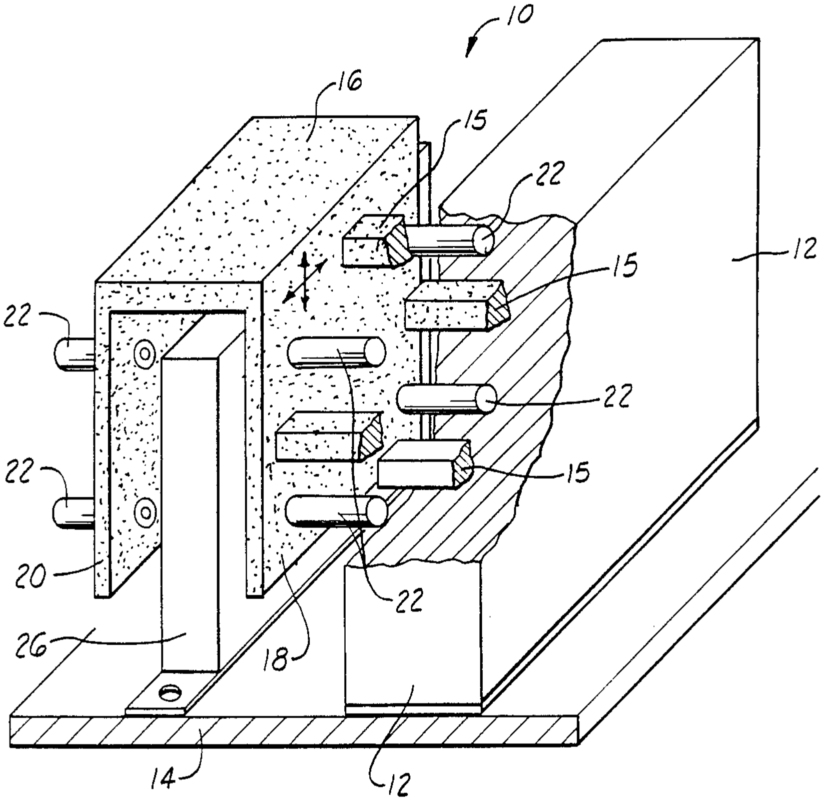
FIG. 1 is a perspective view of the matrix switching device with a portion of the position table cut-away.

In FIG. 1 the universal matrix switching device is designated by general reference numeral 10. The device 10 is connected to a computer controller for interfacing with a unit under test. The computer controller and unit under test are not shown in the drawings. The device 10 includes a position table 12 mounted on a flat horizontal base 14. The table 12 is attached to a plurality of horizontal supports 15 which are in turn attached to a movable plate 16. The plate 16 is "U" shaped having a first downwardly extending first leg 18 and a downwardly extending second leg 20. Mounted to the legs 18 and 20 are a plurality of push-type actuators 22 having electrical leads 24 which are connected to the computer controller and under its command.

Figure 3:
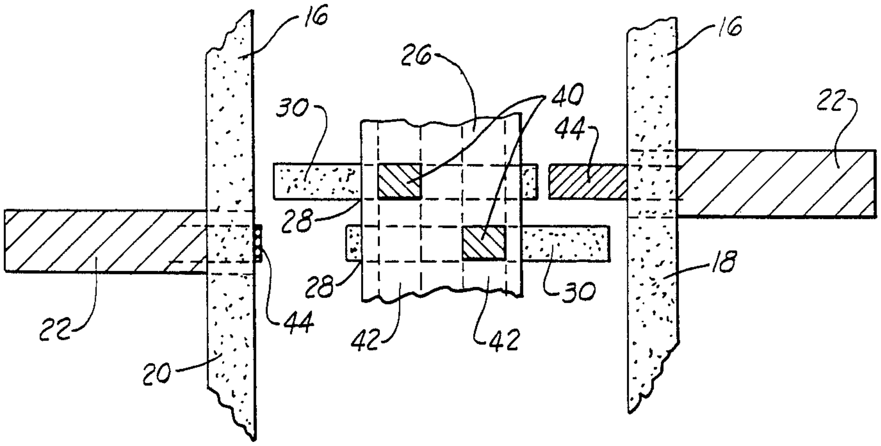
FIG. 3 is an enlarged side view of a portion of the movable plate and matrix board.
Figure 2:
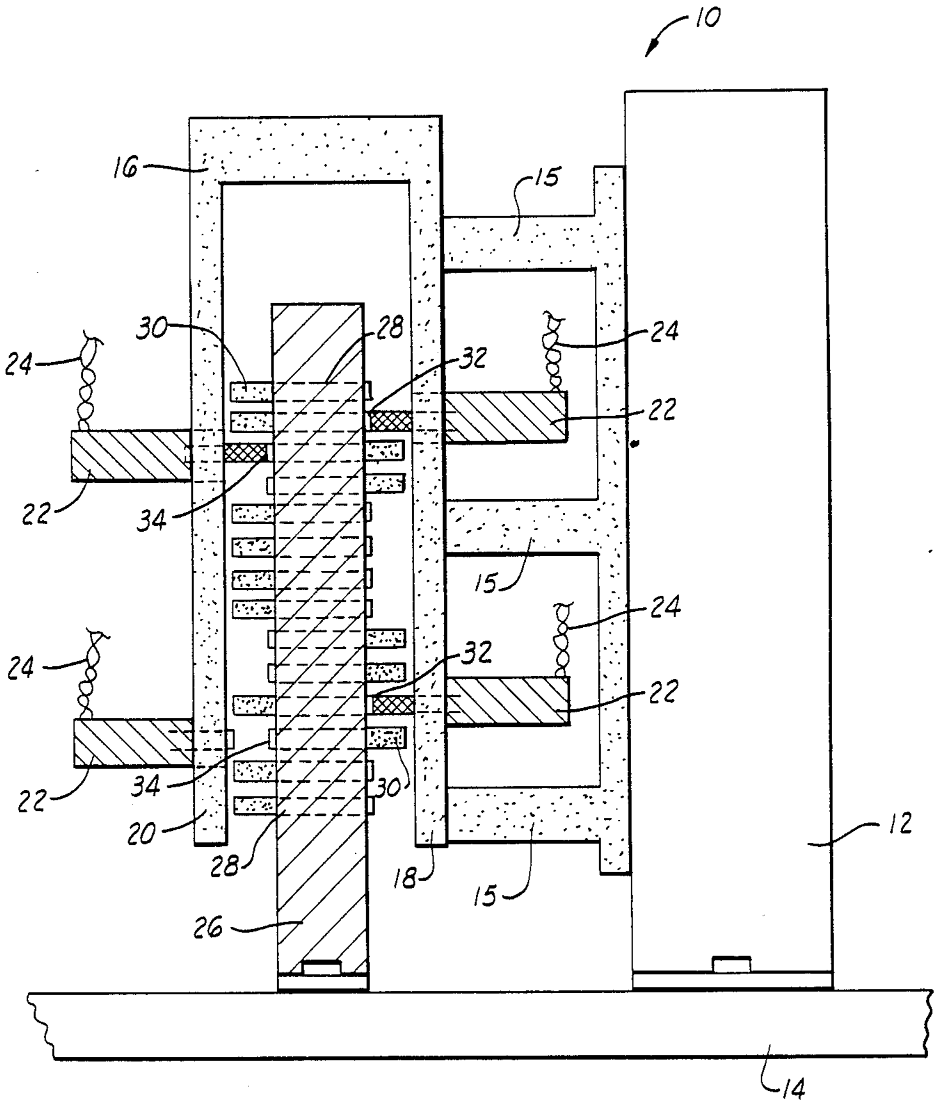
FIG. 2 is a side view of the device.

Also attached to the horizontal base 14 is an upwardly extending matrix board 26 having a plurality of apertures 28 therein for receiving movable pins 30 therein and shown more clearly in FIGS. 2 and 3.

In FIG. 2 a side view of the device 10 is shown illustrating a pair of actuators 22 mounted on the first leg 18 and having engaged one end 32 of pins 30, moving the pins 30 from a first position to a second position with the pins extending outwardly on the left hand side of the matrix board 26. When the actuators 22 are relaxed and moved to a neutral or retracted position, as shown in the lower actuator 22 on the second leg 20, the "U" shaped mounting plate 16 may be moved in a plane parallel to the matrix board 26. By positioning an actuator 22 on the second leg 20 in front of a second end 34 of a pin 30, the pin may be moved from its second position returning to its first position with the pin 30 extending outwardly on the right hand side of the matrix board 26.

Referring now to FIG. 3, the pins 30 can be seen in a portion of the matrix board 26 having an electrical contact 40 therearound which is used for engaging transmission conductor strips 42 which are received in slots cut on both sides of the matrix board 26 and orthogonally oriented forming a grid pattern. When the pins 30 with electrical contacts 40 are moved from a first position to a second position and then returned to the first position using push actuator rods 44 of the actuators 22, the electrical contacts 40 in turn engage the conductor strips 42 on one side of the matrix board 26 and when the pins are moved from the first position to the second position disengage the conductor strips and re-engage conductor strips on the opposite side of the matrix board when the pins are in a second position.

The "U" shaped plate 16 prevents the pins 30 from being accidently removed from the matrix board 26 with the actuator rods 44 of the actuators 22 moving the pins 30 from the first position to the second position and then when desired returning the pins 30 to the first position. The actuator rods 44 and pins 30 are rounded to prevent inadvertent hooking when the actuators 22 are repositioning the pins 30 during the operation of the switching device 10.

Changes may be made in the construction and arrangement of the parts or elements of the embodiments as described herein without departing from the spirit or scope of the invention defined in the following claims.

What is claimed is:

1. In a universal matrix switching device including a matrix board having a plurality of pins disposed for axial movement in respective transverse apertures in said board for selective electrical contact with transversely-spaced conductor strips disposed in said board and exposed for contact in said apertures, a position table associated with said board for selectively moving in a plane parallel to said board, actuator means for selectively axially moving said pins into and out of electrical contact with said strips, and control means for selectively controlling said position table and said actuator means, the improved actuator means comprising:

a plurality of unidirectional linear actuators disposed in two planar arrays on opposite sides of said matrix board, each said actuator including a rod disposed for selective axial movement between positions retracted from and extended toward said matrix board, and means operatively connected to said position table for supporting said actuators in said planar arrays at an axial distance from said matrix board such that when said rods are in said retracted positions said supporting means is moveable relative to said matrix board and when said rods are moved into said extended positions, axially-aligned pins in said matrix board are axially moved in said apertures for selective electrical contact with said conductor strips, said pins in said matrix board being axially moved in one direction by actuator rods in one said planar array and axially moved in the other direction by actuator rods in the other said planar array.

2. The device of claim 1 wherein said supporting means comprises a U-shaped plate having two depending walls, one said wall being disposed on each side of said matrix board and operably supporting the actuators in a respective one of said planar arrays, said plate being supported by said position table for movement relative and parallel to said matrix board to selectively axially align said actuators with apertures therein.

* * * * *